(12) United States Patent
Flynn

(10) Patent No.: US 6,899,938 B2
(45) Date of Patent: May 31, 2005

(54) PHASE CHANGE DATA STORAGE DEVICE FOR MULTI-LEVEL RECORDING

(75) Inventor: Kelly Daly Flynn, Clarkston, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 10/081,401

(22) Filed: Feb. 22, 2002

(65) Prior Publication Data

US 2003/0165111 A1 Sep. 4, 2003

(51) Int. Cl.$^7$ .................................................. B32B 3/02
(52) U.S. Cl. ..................... 428/64.5; 428/64.2; 428/64.4
(58) Field of Search ............................... 428/64.2, 64.4, 428/64.5

(56) References Cited

U.S. PATENT DOCUMENTS

| | | | |
|---|---|---|---|
| 4,818,666 | A | 4/1989 | Gravesteijn |
| 4,975,355 | A | 12/1990 | Suzuki |
| 5,335,219 | A | 8/1994 | Ovshinsky et al. |
| 5,709,978 | A | 1/1998 | Hirotsune |
| 6,108,295 | A | 8/2000 | Ohno |
| 2001/0036596 | A1 * | 11/2001 | Mizushima et al. ... 430/270.13 |
| 2002/0160305 | A1 * | 10/2002 | Horie et al. ............... 428/64.5 |

OTHER PUBLICATIONS

"Materials Characteristics for High Performance Multi-Level Recording with InSb Te Phase Change Materials", Daly–Flynn et a.*
"InSbTe Phase Change Materials for High Performance Multi-Level Recording", Daly–Flynn et al, Japan J. Appl. Phys. vol. 42 (Feb. 2003) pp. 795–799.*

* cited by examiner

Primary Examiner—Deborah Jones
Assistant Examiner—G. Blackwell-Rudasill
(74) Attorney, Agent, or Firm—Frederick W. Mau, II; Marvin S. Siskind

(57) ABSTRACT

An optical data storage device for multi-level recording having: a substrate, and a phase change memory medium supported by the substrate. The phase change memory medium preferably has an alloy with a eutectic crystallization base component and at least one element for enhanced sigma-to-dynamic range. The multi-level data storage device is preferably an optical disk with a single layer of memory material for providing multi-level recording with a sigma-to-dynamic range of less than 2%.

The phase change recording alloy is preferably an In:Sb:Te material. Preferably, Sb:Te is present at a ratio at, or near, the eutectic point when combined with 30% or less In. A preferred phase change memory material includes an alloy defined by the formula: $In_x(Sb_nTe_{100-n})_{100-x}$ where x is 3–30, and n is 63–82.

18 Claims, 3 Drawing Sheets

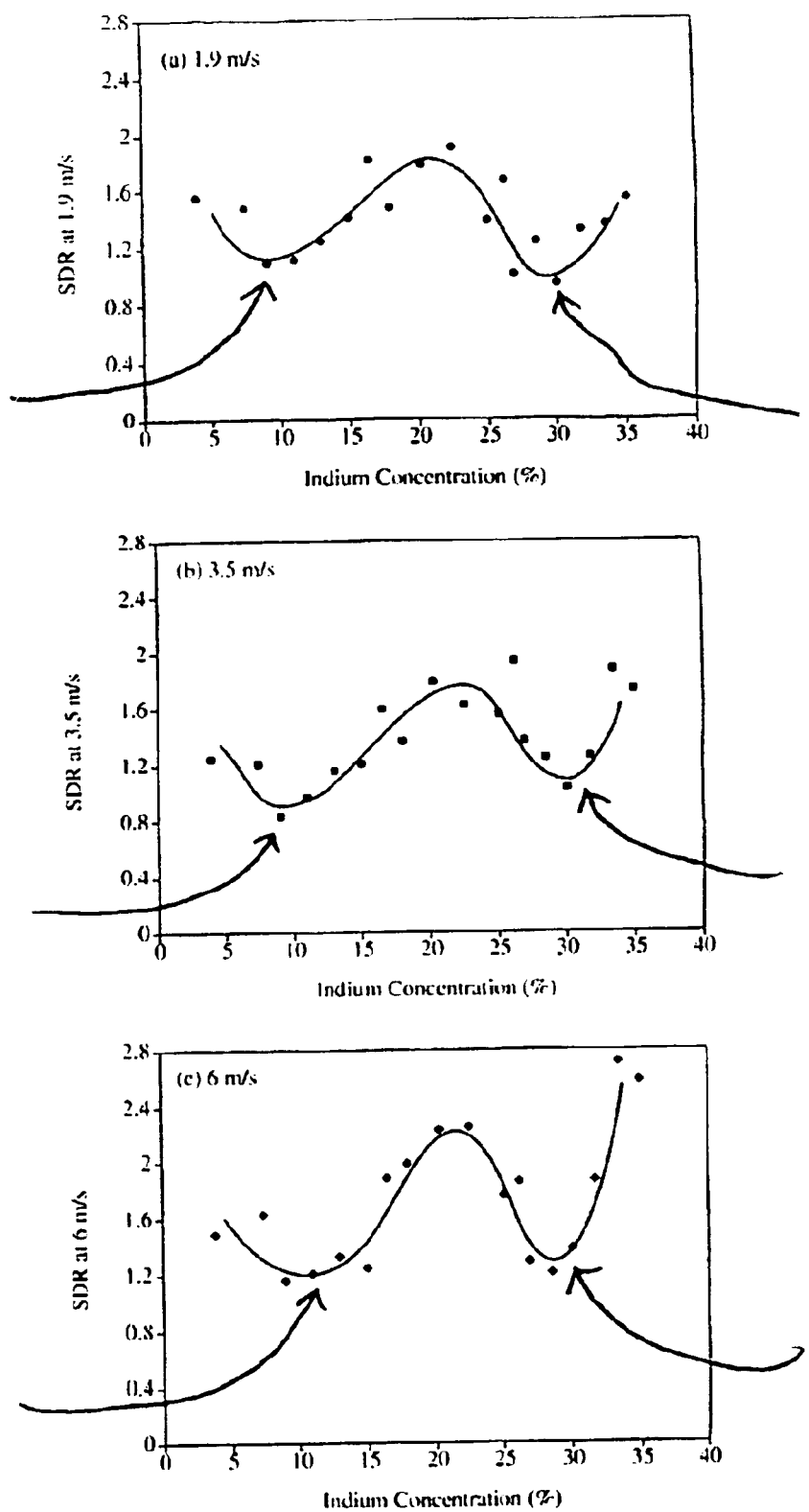
Fig. 2. (a): SDR vs indium concentration at 1.9 m/s. (b): SDR vs indium concentration at 3.5 m/s. (c): SDR vs indium concentration at 6 m/s.

PHASE CHANGE DATA STORAGE DEVICE FOR MULTI-LEVEL RECORDING

BACKGROUND OF THE INVENTION

I. Field of the Invention

The present invention pertains phase change data storage devices having 2 or more bits of data per memory cell that are achieved by attaining multiple reflectivities. More particularly, the present invention pertains to an optical data storage devices having a single or multiple layer(s) of phase change medium that achieves multi-level reflectivity.

II. Description of the Background

Nonablative state changeable data storage systems, for example, phase change optical data storage systems, record information in a state changeable material that is switchable between at least two detectable states by the application of energy, such as, for example, laser light, projected optical beam energy, electrical energy, or thermal energy, thereto.

State changeable data storage materials are typically incorporated into a data storage device having a structure such that the data storage material is supported on a substrate and protected by encapsulants. In the case of optical data storage devices, the encapsulants include, for example, anti-ablation materials and layers, thermal insulation materials and layers, anti-reflection materials and layers, reflective layers, and chemical isolation layers. Moreover, various layers are used to perform one or more of these functions. For example, anti-reflection layers may also be used as anti-ablation layers and/or thermal insulating layers. The thickness of the layers, including the layer of state changeable data storage material, are engineered to minimize the energy necessary for effecting the state change and to optimize the high contrast ratio, high carrier to noise ratio, and high stability of the phase change materials.

The phase changeable material is a medium capable of being switched from one detectable state to another detectable state or states by the application of energy, such as projected beam energy, electrical energy, or thermal energy thereto. The detectable states of state changeable materials may differ in their morphology, surface topography, relative degree of order, relative degree of disorder, electrical properties, optical properties, including indices of refraction and reflectivity, or combinations of one or more of the foregoing. The state of the phase changeable material is detectable by properties such as, for example, the electrical conductivity, electrical resistivity, optical transmissivity, optical absorption, optical refraction, optical reflectivity, or combinations thereof. That is, the magnitude of the detectable property will vary in a substantially predictable manner as the phase changeable material changes state.

Phase change data storage devices are typically made by the deposition of individual layers onto a substrate. A number of techniques have been developed which include evaporative deposition, chemical vapor deposition, and/or plasma deposition. As used herein plasma deposition includes, but is not limited to, sputtering, glow discharge, plasma assisted chemical vapor deposition, microwave plasma vapor deposition, etc.

One example of phase change memory materials used in data devices include the Tellurium based alloys. The state change of Tellurium based alloys is a structural change evidenced by a change in a physical property, such as reflectivity. This effect is described, for example, in J. Feinleib, J. deNeufville, S. C. Moss, and S. R. Ovshinsky, "Rapid Reversible Light-Induced Crystallization of Amorphous Semiconductors," Appl. Phys. Lett., Vol. 18(6), pages 254–257 (Mar. 15, 1971).

Tellurium based state changeable alloys, in general, are single or multi-phased systems where: (1) the ordering phenomena includes a nucleation and/or growth process (including both or either homogeneous and heterogeneous nucleations) to convert a system of disordered materials to a system of ordered and disordered materials; and (2) the vitrification phenomena include melting and rapid quenching of the phase changeable material to transform a system of disordered and ordered materials to a system of largely disordered materials. The above phase changes and separations occur over relatively small distances, with intimate interlocking of the phases and gross structural discrimination, and are highly sensitive to local variations in stoichiometry.

In chalcogenide type memory materials, the measures of performance include (1) the contrast ratio, that is, the difference in reflectivity of the states divided by the sums of the reflectivity of the states, and (2) the carrier to noise ratios of both (a) the "written" and (b) the "erased" states. The failure mode of the memory material as evidenced by the deterioration in the measures of performance with respect to the number of cycles. That is, failure may be evidenced by for example, a reduction in contrast ratio with increasing cycles, by a reduction in the written carrier to noise ratio or by an increase in the erased carrier-to-noise ratio.

In present day phase change memory devices it is customary to write or record onto an initial crystalline state by switching it to an amorphous state. The integrity of recording depends on the ability of the amorphous second state to resist spontaneous or accidental crystallization into the written state. The higher the glass transition temperature of the recording medium, the more likely the medium will resist undesirable crystallization when in the amorphous state, particularly when the recorded region consists of alternating regions of recorded crystalline spots and unaltered amorphous regions. Of course, the crystallization temperature must not be so high that recording sensitivity suffers significantly.

In addition to the write capability of phase change recording devices, it may be desirable that the memory material also be erasable. In a typical application, the phase change material is reversibly capable of changing from the amorphous to the crystalline state, and back again, repeatedly, such that memory medium may be recorded upon, erased, re-recorded upon, re-erased numerous times.

One recognized limitation of present day, phase change data storage devices is in the capability to store increasing amounts of data. One system, which has been reported to increase the data storage capacity of conventional memory technology, is multi-level recording. Multi-level recording offers the potential to produce more than two bytes of data per memory cell.

One way to obtain multi-level recording is with a single layer of memory material, which has more that two detectable states. See for example U.S. Pat. No. 5,335,219, entitled "Homogeneous Composition of Microcrystalline Semiconductor Material, Semiconductor Devices and Directly Overwritable Memory Elements Fabricated Therefrom, and Arrays Fabricated from the Memory Elements", issued on Aug. 2, 1994 to Ovshinsky et. al., the disclosure of which is herein incorporated by reference.

However, problems associated with accurately writing and detecting multiple signal levels have limited commercial use of multi-level recording applications. These problems occur primarily from poor signal to noise or sigma-to-dynamic range capabilities of the phase change recording material. One attempt to address the problems of high relative noise and inaccurate signal reproduction involves error detection and correction schemes. Error detection and correction schemes are supposed to compensate for problems associated with writing accuracy and repeatability.

Although these schemes can greatly compensate for write inaccuracy, error correction often uses otherwise employable storage capacity. Error correction also increases read and access times. Therefore, there is presently a need for an improved high density, multi-level phase change memory materials that can be accurately written to with numerous signal levels.

Multi-level recording can be produced by several different writing methods. One method, which will be designated as the fast cooling method, utilizes a single laser pulse. The pulse heats the chalcogenide alloy above the crystallization temperature, and after the laser pulse ends, the chalcogenide alloy rapidly cools to form a mixture of amorphous and crystalline phases over a given volume of memory material. The second method utilizes slow cooling and may be done with one, two or more laser pulses. When two laser pulses are used, a first laser pulse heats the chalcogenide alloy to a temperature above melting, and a second laser pulse, delivered a short period of time after the first laser pulse, alters the cooling rate causing partial recrystallization. Alternatively, the slow cooling method can be provided by a single laser pulse having multiple power levels. The laser pulse may be provided first with a high power (>12 mw) to melt the phase change material and then with a second lower power, such as medium power (5–9 mW) to reduce the cooling rate of recrystallization. Crystallization by the fast cooling method can be achieved easily at a wide range of speeds (1 to >15 m/s) and is a mechanism by which phase change optical recording occurs. However, overwriting is often unacceptable due to incomplete erasure of previous data. The slow cooling method, on the other hand, raises the temperature of the material above the melting point to aid in erasing or overwriting data. However, the mechanism by which this method works makes functioning at faster speeds (>2 m/s) difficult.

SUMMARY OF THE INVENTION

The present invention, to addresses the above mentioned problems and others, provides a multi-level optical data storage device having a substrate and at least one phase change recording medium supported by the substrate, the phase change recording medium having a eutectic crystallization base component and at least one element for enhanced sigma-to-dynamic range. The multi-level data storage device is preferably an optical disk with a single layer of memory material for providing multi-level recording with a sigma-to dynamic-range of less than 2%. The memory material preferably has 7 or more detectable levels and more preferably has at least 11 detectable levels. In a preferred aspect of the present invention the phase change material forms a second phase during recording.

In another preferred aspect of the present invention, the phase change recording medium consists essentially of an In:Sb:Te material. Preferably, Sb:Te is present at a ratio at, or near, the eutectic point when combined with 30% or less In. A preferred phase change memory material includes an alloy defined by the formula: $In_x(Sb_nTe_{100-n})_{100-x}$ where x is 3–30, and n is 63–82.

For a more complete understanding of the present invention, reference is now made to the following detailed description and accompanying drawings.

BRIEF DESCRIPTION OF THE DRAWINGS

FIG. 2 is a graph of a multi-level read of a phase change memory device prepared in accordance with the present invention.

DETAILED DESCRIPTION OF THE PREFERRED EMBODIMENTS

Figure 1A:
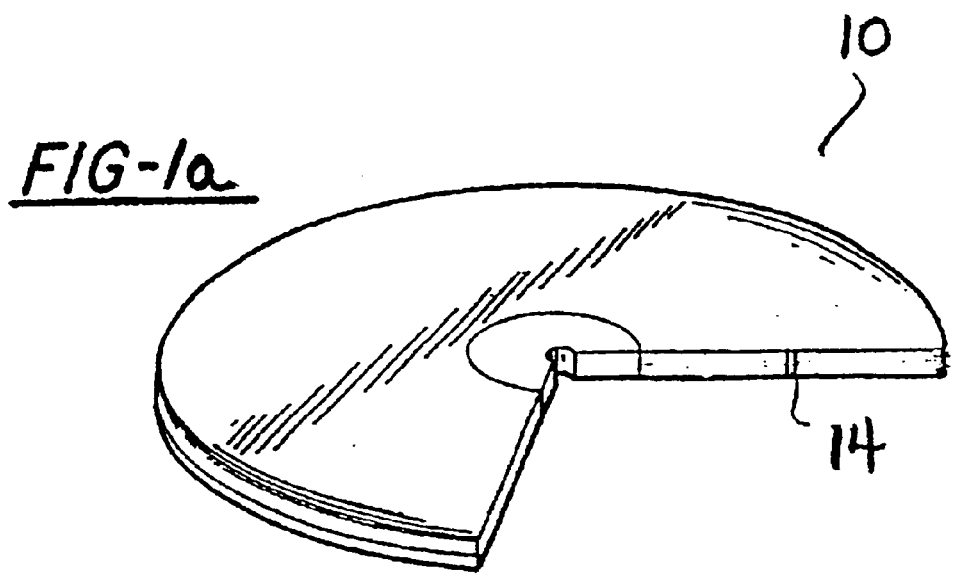
FIG. 1a is a phase change memory device in accordance with the present invention with part in cross section.
Figure 1B:
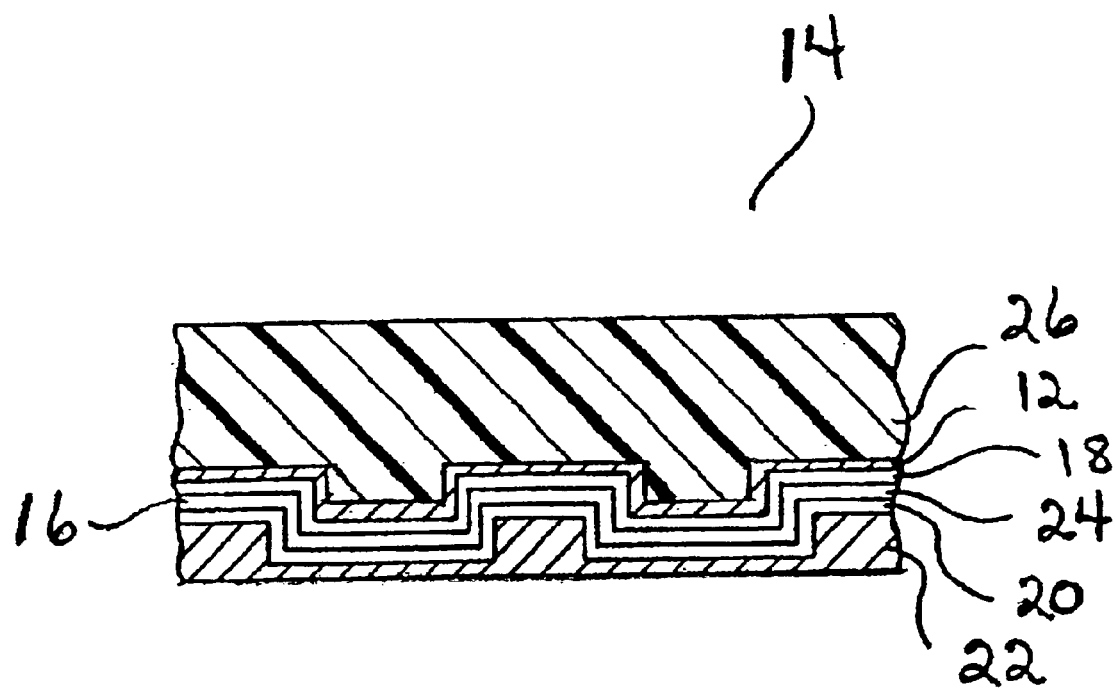
FIG. 1b is a cross sectional view of a phase change memory device taken from FIG. 1a in accordance with the present invention.

With more particularity, and with reference to FIGS. 1a–1b, therein is generally depicted therein at 10 a phase change optical data storage device having a substrate 12 and a phase change memory material 16 supported by the substrate 12. The phase change memory material 16 includes a phase change alloy with a eutectic base component and at least one element for providing multi-level recording with enhanced sigma-to-dynamic range. The optical data storage device is preferably a multi-level optical disk with a phase change memory material for providing 5 or more discrete signal levels, preferably 7 or more, more preferably 9 or more, and most preferably 11 or more.

FIG. 1b depicts an exploded view of a cross-section of the data storage device 10 taken at 14 of the multi-level phase change data storage device of FIG. 1a showing some possible layers. As shown, the optical data storage device includes a substrate 12, a first dielectric layer 18, a memory layer 24, and a second dielectric layer 20. The device 10 may further include an additional reflective, thermally conductive or metallic layer 26 and a protective coating 22.

The substrate 12 is preferably an optically invariant, optically isotropic, transparent material having a predetermined thickness. The substrate is preferably about 0.6 mm to about 1.5 mm in thickness but may be as small as 0.1 mm. Examples of suitable materials include optically clear polymeric materials, such as polymethylmethacrylate, polycarbonate, etc. The substrate may be formed by any suitable formation method including, molding, injection molding, casting, extruding, embossing, stamping, coating, etc.

Deposited atop the substrate 12 may be a dielectric layer 18. The dielectric layer 18 acts as a barrier to isolate the memory layer 24 and may serve to prevent oxidizing agents from contaminating the memory material. The dielectric layer 18 may also prevent the substrate from deforming due to local heating of the memory layer 24 during writing and overwriting. The dielectric layer 18 is preferably from about 500 to about 2000 angstroms thick. The dielectric layer may also serve as an anti-reflective coating for increasing the optical sensitivity of the memory layer 24. Suitable dielectric materials include zinc sulfide, silicon oxide, germanium nitride, germanium oxide, silica, alumina, silicon nitride, silicon nitrite, combinations of the above, and the like.

A second dielectric layer 20 may be provided on the other side of the memory layer 24 and may provide similar or identical functions as the first dielectric layer 18. The dielectric layers 18, 20 may therefore surround or sandwich the memory layer 24. The second dielectric layer 20 may be of equal thickness as the first layer 18 and of similar composition. Alternatively, the second dielectric layer may be a different thickness (preferably thinner) and/or a different composition than the first.

The disk 10 has at least one memory layer 24, which includes a phase change material. The memory layer 24 is preferably a single layer disposed between the two dielectric layers. Alternatively, the at least one memory layer may be provided as multiple layers, each layer being isolated from one another, as in the case of a multi-layer recording device. However, it has been found that a single layer of memory material in recording devices has a number of advantages over multiple memory layers. For instance, the shear complexity of managing multiple layers of memory material presents a number of problems associated with thermal management and signal to noise. A single memory layer may therefore be advantageous over multiple memory layers because they are more easily managed.

Multi-level recording may be provided by a number of different write strategies. Signal levels are preferably separated by an amount equal to the standard deviation of writing a signal level. One strategy of multi-level recording involves selective crystallization. Selective crystallization may be provided by varying the spot size in a fixed cell to provide multiple states of reflectivity. Signal level is a function of reflectivity and is measured by a response in voltage. Reflectivity is a function of crystallization over a given area or volume of memory material. As reflectivity is a function of crystallization, a partially written cell may be erased, overwritten, or changed by amorphizing or further crystallizing the cell a predetermined amount. In these scenarios, signal level is a function of the degree of crystallization or lack thereof.

One measure of selective crystallization is sigma-to-dynamic range. Sigma-to-dynamic range is a measure of accurately writing a discrete level to the memory material and the standard deviation of achieving that level. For example, a desired signal level may have a target of 20% reflectivity. When writing to produce the desired signal level, the exact reflectivity may fall within a range of predictable values depending upon the variability of the recording system and the recording device. As the reproducibility of the recording system is far greater than that of the recording medium, this variability in turn becomes a measure of the recording devices ability for selective crystallization.

FIG. 2 shows a summary of analysis of multi-level data. The data were recorded at 1.9 m/s. One hundred data files were collected each containing 7 multi-level stair-step patterns for a total of 700 stair-step patterns averaged and analyzed. The top figure shows the averaged stair-step pattern labeled with the standard deviation of each level. The next figure down shows a variety of sigma-to-dynamic ranges (SDRs) for each level. The next two figures down display the reflectivity level of each stair-step measured. These figures are analogous to eye-patterns on an analog scope. Well defined levels, as seen in this figure, are an indication of a low SDR. The bottom figure shows a histogram of all reflectivity levels achieved. Well defined peaks representing each reflectivity level, as seen in this figure, are an indication of a low SDR.

The phase change material may include any type of phase change alloy capable of multi-level recording with a SDR of less than 2%. Preferably, the SDR is less than 1.5% and more preferably 1.0% or less. The phase change material preferably has two elements that provide a eutectic base alloy and a third element for altering the eutectic base alloy. The phase change material preferably allows an optical memory disk with an enhanced SDR of <2% at fast write speeds >3 m/s and a high cycle life >1000 overwrite cycles.

Figure 3:
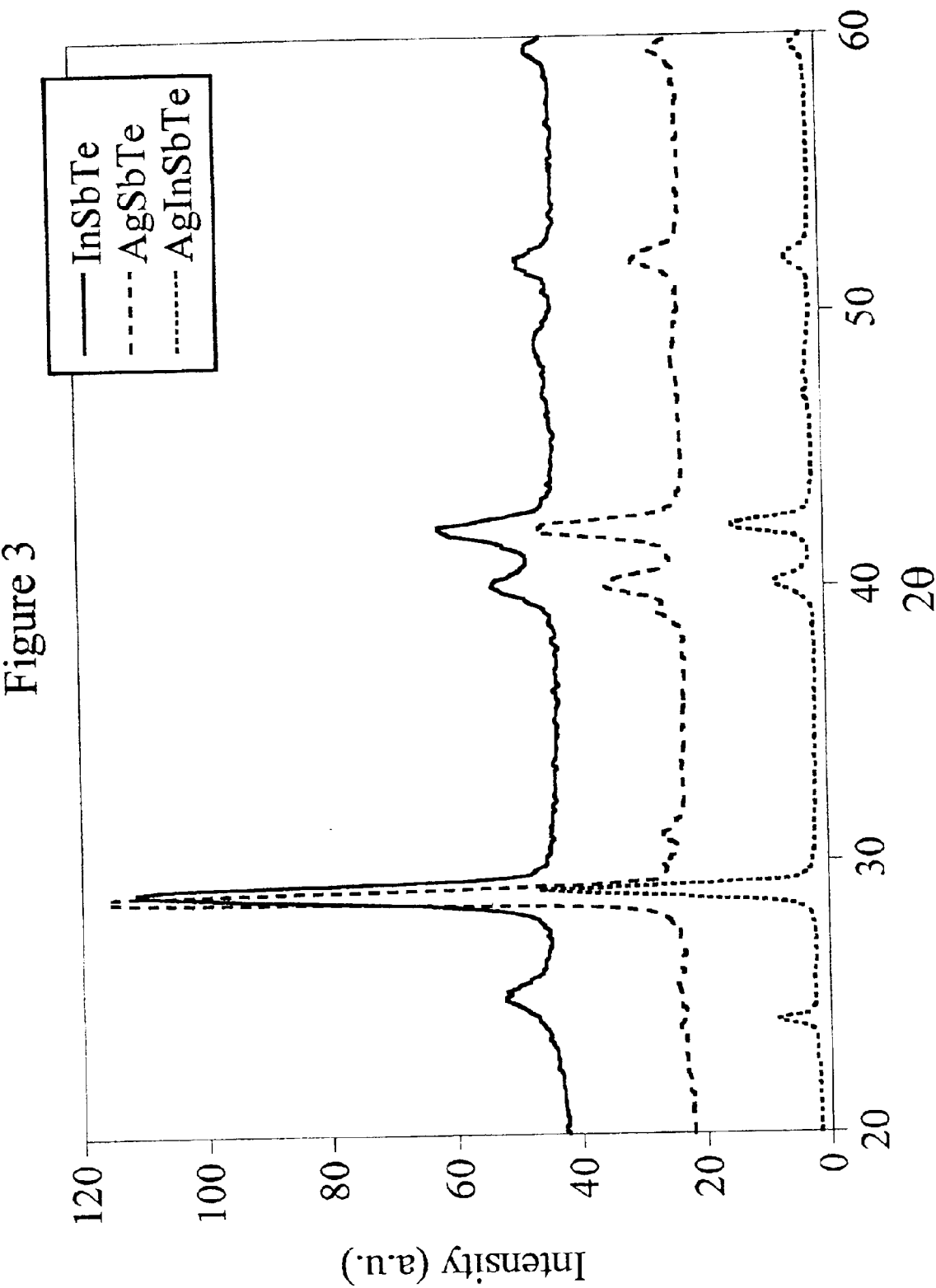
FIG. 3 is an x-ray diffraction pattern of a phase change material having a second phase during recording in accordance with the present invention.

The phase change alloy as shown in FIG. 3 has peak with a substantial FWHM (above that of background and greater than that of commercial AgInSbTe materials) at around 2 theta=24–26 degrees of X-ray diffraction using CuKα.

FIG. 3 depicts a comparison between an x-ray diffraction pattern (obtained using a CuKα detector) of a thin film of conventional material to one in accordance with the present invention. The comparison shows that the preferred alloy has additional peaks at 24–26° and 47–49° which are substantial in FWHM or area. Although not desiring to be bound by theory, these additional peaks may show the presence of a second, less dominant or minor phase. This second, less dominant phase may be important in allowing preferred melt recrystallization. One hypothesis suggests that at slower cooling rates during melt recrystallization, this second phase forms first and serves as a nucleator for improving the major switching phase. If the proper nucleating phase does not form, particularly at reduced cooling rates but at higher disk rotational speeds, crystallization may not occur. For example, commercial Ag:In:Sb:Te alloys with a low In concentration and/or a high Ag:In ratio, may selectively crystallize at slow speeds (~2 m/s) with the two pulse write method, but fails to selectively crystallize at high speeds (>3 m/s). Compositions with high In and/or a low Ag:In ratio are capable of a two pulse melt recrystallization at an intermediate range of speeds (2–6 m/s) but suffer otherwise, and systems containing Ag($Sb_{70}Te_{30}$) tend to properly crystallize with the two pulse method only at slow speeds. In comparison to commercial materials, and as shown in Table 1, alloys of the present invention selectively crystallize with a two-pulse, or slow cooling method at both high and low speeds.

EXAMPLE

The results show that for In:Sb:Te composition, more accurate multi-level data recording can be achieved at high speeds.

TABLE 1

Phase change materials with multilevel writing at various speeds.

| Phase Change Alloy | SDR at 1.9 m/s | SDR at 3.5 m/s | SDR at 6 m/s |
|---|---|---|---|
| ECD In:Sb:Te | 1.10% | 0.84% | 1.16% |
| Commercial AgInSbTe | 1.04% | 1.51% | 2.12% |

A preferred phase change alloy is represented by eutectic alloys having the composition M($Sb_{70}Te_{30}$), where M is one or more transition metals or main group metals. The alloy is preferably Ag free or substantially Ag free. SbTe is preferably present at the eutectic composition. Sb:Te is preferably present at a 70:30 atomic ratio +/−20% relative to one another. A most preferred composition includes Sb at 72% and Te at 28% relative to one another. M is preferably at least one main group metal, more preferably In. In is preferably present at an atomic ratio of 3 to 30% relative to the total alloy, preferably 7–15%, and most preferably 9–13%. The alloy preferably has a composition characterized by the formula: $In_x(Sb_nTe_{n-100})_{x-100}$ where x is 3–30, n is 63–82. Examples of preferred alloys include $In_9(Sb_{72}Te_{28})_{91}$, $In_{10}(Sb_{72}Te_{28})_{90}$, and $In_{11}(Sb_{72}Te_{28})_{89}$. An In:Sb:Te phase change material allows for multi-level recording over a wide range of usable speeds with improved sigma-to-dynamic range, especially between 2 m/s to 8 m/s.

By comparing the materials of the present invention with phase change alloys currently used in CD-RW, Ag:In:Sb:Te, the SDR obtained at 3.5 and 6 m/s for In(SbTe) is lower than commercial media, and is lower than otherwise previously achieved SDRs of ~2.0% at 6 m/s for high quality media. The data storage device of the present invention therefore provides a modified phase change material which may have a reduced sigma-to-dynamic-range level of 1.5% or less relative to present day commercial material when optimized for speed, composition, and stack design.

In determining concentrations for preferred stack designs In concentration was varied between 3.9 and 30% while Sb:Te was held constant and the sigma-to-dynamic range was determined. The results are listed in Table 2, below.

TABLE 2

SDR at Varying Concentrations of In and Varying Speeds.

| % In | SDR at 1.9 m/s | SDR at 3.5 m/s | SDR at 6 m/s |
|---|---|---|---|
| 3.9 | 1.56 | 1.25 | 1.49 |
| 7.4 | 1.49 | 1.21 | 1.63 |
| 9.0 | 1.10 | 0.84 | 1.16 |
| 11.0 | 1.12 | 0.97 | 1.21 |
| 13.0 | 1.25 | 1.16 | 1.33 |
| 15.0 | 1.42 | 1.21 | 1.25 |
| 16.5 | 1.82 | 1.60 | 1.89 |
| 18.0 | 1.49 | 1.37 | 1.99 |
| 20.3 | 1.78 | 1.80 | 2.23 |
| 22.5 | 1.91 | 1.63 | 2.72 |
| 25.0 | 1.40 | 1.56 | 1.76 |
| 27.0 | 2.06 | 1.83 | 2.33 |
| 30.0 | 0.96 | 1.03 | 1.38 |

While the invention has been illustrated in detail in the drawings and the foregoing description, the same is to be considered as illustrative and not restrictive in character as the present invention and the concepts herein may be applied to any system where energy is used to change the state of the phase change material in a predictable manner. The present invention may be applied particularly to any type of memory system wherein energy is provided to render more than 2 detectable states, such as multi-level optical memory, multi-level optical memory disks, etc. Thus, it is to be understood that only the preferred embodiments have been shown and described fully and that all changes and modifications that come within the spirit of the invention are desired to be protected.

What is claimed is:

1. A multi-level recording device comprising:

a substrate; and a memory material supported by the substrate, the memory material including a phase change alloy defined by: $In_x(Sb_nTe_{100-n})_{100-x}$ wherein x is 7.4–18 or 25–30, n is 63–82.

2. The device of claim 1, wherein x is 9–15.

3. The device of claim 1, wherein x is 9–13.

4. The device of claim 1, wherein the phase change alloy is $In_9(Sb_{72}Te_{28})_{91}$.

5. The device of claim 1, wherein the phase change alloy is $In_{10}(Sb_{72}Te_{28})_{90}$.

6. The device of claim 1, wherein the phase change alloy is $In_{11}(Sb_{72}Te_{28})_{89}$.

7. The device of claim 1, wherein the phase change alloy has a peak with a substantial FWHM at around 2 theta= 24–26 degrees of X-ray diffraction using CuKα.

8. A multi-level recording device comprising:

a substrate; and a phase change alloy supported on the substrate, the phase change alloy lacking silver and having a eutetic base alloy composition with at least one element for providing a sigma-to-dynamic range of less than 2%.

9. The device of claim 8, wherein the phase change alloy has a peak with a substantial FWHM at around 2 theta= 24–26 degrees of X-ray diffraction using CuKα.

10. The device of claim 8, wherein the alloy has at least two phases during data recording, one phase being a major phase and the other phase being a minor phase.

11. The device of claim 9, wherein the device is an optical memory disk.

12. The device of claim 9, wherein the device has 7 or more detectable levels.

13. The device of claim 9, wherein the device has at least 11 detectable levels.

14. The device of claim 10, wherein the memory material including a phase change alloy defined by: $M_x(Sb_nTe_{100-n})_{100-x}$ wherein x is 7.4–15 or 25–30, n is 63–82, where M is at least one main group metal.

15. The device of claim 14, wherein x is 9–15.

16. The device of claim 14, wherein x is 9–13.

17. The device of claim 10, wherein the FWHM at around 2 theta=24–26 degrees of X-ray diffraction using CuKα is greater than that of AgIn(SbTe) at a corresponding concentration for M.

18. The device of claim 1, wherein x is 30.

* * * * *